United States Patent
Maheshwari et al.

(10) Patent No.: US 8,668,864 B2
(45) Date of Patent: Mar. 11, 2014

(54) POLYMER COMPOSITE MATERIALS AND PROCESSES THEREFOR

(75) Inventors: Mahendra Maheshwari, Bel Air, MD (US); Xiaomei Fang, Niskayuna, NY (US)

(73) Assignee: MRA Systems Inc., Baltimore, MD (US)

( * ) Notice: Subject to any disclaimer, the term of this patent is extended or adjusted under 35 U.S.C. 154(b) by 0 days.

(21) Appl. No.: 13/118,885

(22) Filed: May 31, 2011

(65) Prior Publication Data

US 2012/0305172 A1 Dec. 6, 2012

(51) Int. Cl.
*B29C 70/02* (2006.01)

(52) U.S. Cl.
USPC ............ 264/449; 264/241; 264/257; 264/258

(58) Field of Classification Search
USPC .................................. 264/241, 257, 258, 449
See application file for complete search history.

(56) References Cited

U.S. PATENT DOCUMENTS

| | | | |
|---|---|---|---|
| 2,768,923 A * | 10/1956 | Kepple et al. | ................. 428/148 |
| 3,998,988 A | 12/1976 | Shimomai et al. | |
| 4,543,274 A | 9/1985 | Mulder | |
| 5,134,959 A | 8/1992 | Woodmansee et al. | |
| 7,303,816 B2 | 12/2007 | Nakamura | |
| 2002/0019306 A1 | 2/2002 | Petrak | |
| 2002/0079623 A1 | 6/2002 | Petrak | |
| 2010/0163174 A1 | 7/2010 | Calder et al. | |
| 2011/0281481 A1 * | 11/2011 | Alderson et al. | ................. 442/1 |

FOREIGN PATENT DOCUMENTS

| | | |
|---|---|---|
| WO | 2007135447 A1 | 11/2007 |
| WO | 2008056123 A1 | 5/2008 |
| WO | 2009118509 A1 | 10/2009 |
| WO | 2010088063 A1 | 8/2010 |

OTHER PUBLICATIONS

Search Report and Written Opinion from EP Application No. 12169785.8 dated Aug. 31, 2012.

* cited by examiner

*Primary Examiner* — James Sanders
(74) *Attorney, Agent, or Firm* — John Colligan; Gary M. Hartman; Domenica N. S. Hartman

(57) ABSTRACT

Processes for fabricating polymer composite materials that contain a polymer matrix, reinforcement fabrics, and particles of a filler material. The processes include spraying the particles of the filler material on at least two articles that each comprise at least one of the reinforcement fabrics to form particle-laden articles. The particle-laden articles are stacked to form a stacked structure, and a resin present within the stacked structure is then cured to form a laminate polymer composite material. The process can be employed in the fabrication of at least a portion of an aircraft engine nacelle, for example, the inlet lip of a fan nacelle.

12 Claims, 3 Drawing Sheets

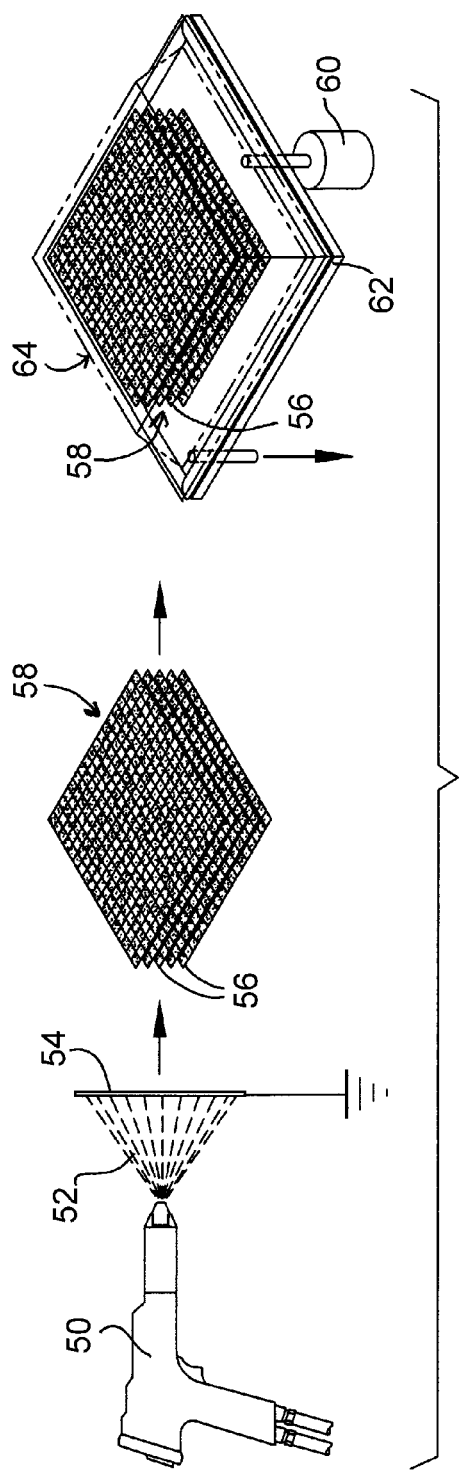
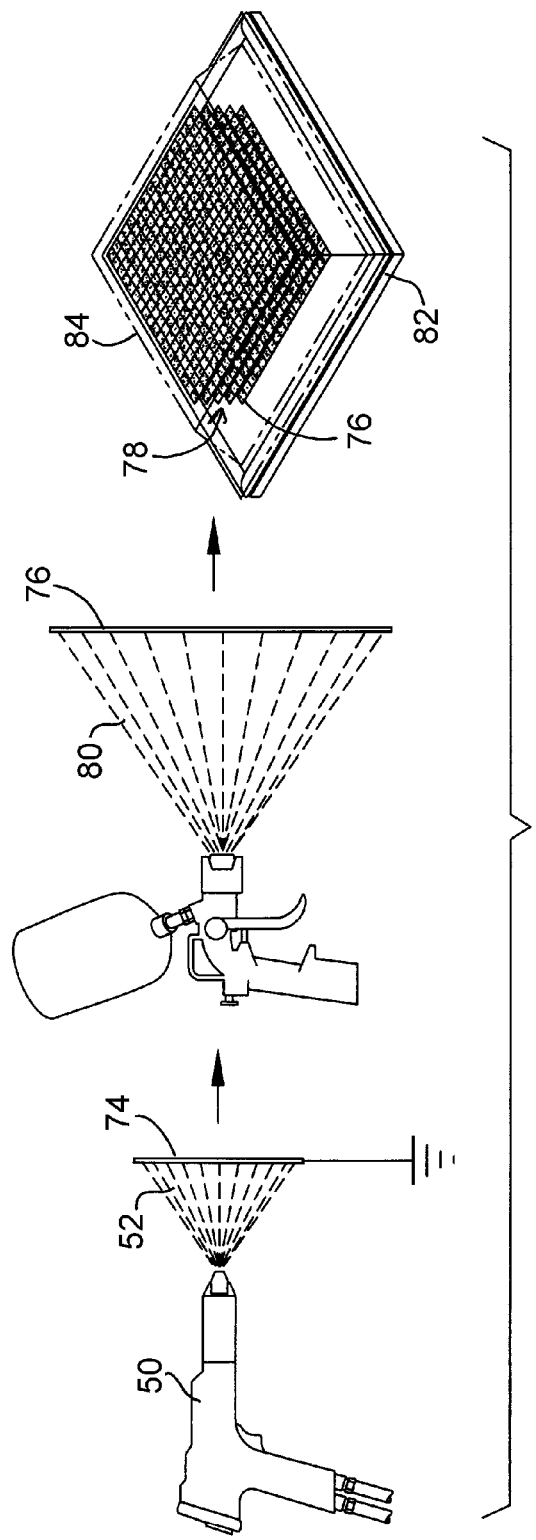

POLYMER COMPOSITE MATERIALS AND PROCESSES THEREFOR

BACKGROUND OF THE INVENTION

The present invention relates to composite materials, and more particularly to processes for fabricating composite materials that comprise a reinforcement fabric infiltrated with a powder-containing resin.

FIG. 1 schematically represents a high-bypass turbofan engine 10 of a type known in the art. The engine 10 is schematically represented as including a fan assembly 12 and a core engine 14. The fan assembly 12 is shown as including a composite fan casing 16 and a spinner nose 20 projecting forward from an array of fan blades 18. Both the spinner nose 20 and fan blades 18 are supported by a fan disc (not shown). The core engine 14 is represented as including a high-pressure compressor 22, a combustor 24, a high-pressure turbine 26 and a low-pressure turbine 28. A large portion of the air that enters the fan assembly 12 is bypassed to the rear of the engine 10 to generate additional engine thrust. The bypassed air passes through an annular-shaped bypass duct 30 and exits the duct 30 through a fan nozzle 32. The fan blades 18 are surrounded by a fan nacelle 34 that defines a radially outward boundary of the bypass duct 30, as well as an inlet duct 36 to the engine 10 and the fan nozzle 32. The core engine 14 is surrounded by a core cowl 38 that defines the radially inward boundary of the bypass duct 30, as well as an exhaust nozzle 40 that extends aftward from the core engine 14.

The fan nacelle 34 is an important structural component whose design considerations include aerodynamic criteria as well as the ability to withstand foreign object damage (FOD). For these reasons, it is important to select appropriate constructions, materials and assembly methods when manufacturing the nacelle 34. Various materials and configurations have been considered, with metallic materials and particularly aluminum alloys being widely used. Composite materials have also been considered, such as epoxy laminates reinforced with carbon (graphite) fibers or fabrics, as they offer advantages including the ability to be fabricated as single-piece parts of sufficient size to meet aerodynamic criteria, contour control, and reduced weight, which promote engine efficiency and improve specific fuel consumption (SFC).

Aircraft engine nacelles are subject to icing conditions, particularly the nacelle leading edge at the inlet lip (42 of FIG. 1) while the engine is on the ground and especially under flight conditions. One well known approach to removing ice buildup (de-icing) and preventing ice buildup (anti-icing) on the nacelle inlet lip 42 has been through the use of hot air bleed systems. As an example, engine-supplied bleed air can be drawn from the combustion chamber 24 through piping (not shown) to the inlet lip 42, where the hot bleed air contacts the internal surface of the inlet lip 42 to heat the lip 42 and remove/prevent ice formation. As an alternative, some smaller turbofans and turboprop aircraft engines have utilized electrical anti-icing systems that convert electrical energy into heat via Joule heating. Resistance-type heater wires can be used as the heating element, though a more recent example uses a flexible graphite material commercially available under the name GRAFOIL® from GrafTech International Holdings Inc. The heating element is embedded in a boot, such as a silicon rubber, which in turn is attached to the inside leading edge of the nacelle inlet lip 42. In either case, uniform and efficient heating of the inlet lip 42 can be promoted if the lip 42 is constructed of a metallic material, such as an aluminum alloy, in comparison to a composite material. To promote uniform heating of an inlet lip 42 fabricated from a composite material, such as a carbon-reinforced (fiber and/or fabric) epoxy laminate, the composite material can be produced to contain conductive fillers capable of promoting its thermal conductivity. Such fillers have included boron nitride (BN), alumina ($Al_2O_3$), and aluminum nitride (AlN) powders and carbon (graphite) nanotubes.

Traditional approaches for incorporating fillers involve admixing the filler particles into the resin system, and then infusing a carbon fabric with the particle-laden resin system. Though effective, the resulting resin system tends to have a relatively high viscosity, which limits the concentration of filler that can be incorporated into the composite. This limitation is due in part to a filtering effect, in which the reinforcement fabric filters the filler particles out of the resin system during the infusion process. To reduce this filtering effect, nano-sized filler particles may be used, though filler loadings of less than 20 volume percent are still typical due to a sharp increase in the viscosity of the resin system. As a result, through-thickness thermal conductivities of inlet lips fabricated from composite materials, such as a carbon fabric-reinforced epoxy laminates, have been limited, typically to thermal conductivity values of about 0.6 W/mK or less.

Mechanical properties, including interlaminar toughness and compression modulus, can also be limited as a result of high-viscosity resin systems tending to promote the occurrence of dry spot defects in composites due to nonuniform infusion of the reinforcement fabric. High-viscosity resin systems also limit the processes by which the resin system can be infused into a reinforcement fabric. For example, it is very difficult to uniformly infuse resin systems containing about 15 volume percent of nano-sized filler particles using such relatively low-cost processes as vacuum-assisted resin transfer molding (VaRTM).

In view of the above, it would be desirable if a method existed by which greater amounts of filler particles could be incorporated into a resin-infused reinforcement fabric. In particular, such a capability would be beneficial for incorporating greater quantities of conductive fillers in fabric-reinforced polymer composites used in the fabrication of fan nacelles. Such a capability would also be beneficial for a variety of other applications, for example, electrical enclosures and aircraft wing/tail regions fabricated from fabric-reinforced polymer composites, in which case the fillers may serve to improve thermal conductivity, electrical conductivity (such as graphite-type fillers), and/or improve interlaminar toughness (such as thermoplastic tougheners in the powder form).

BRIEF DESCRIPTION OF THE INVENTION

The present invention provides processes for fabricating polymer composite materials that comprise a polymer matrix containing multiple reinforcement fabrics and particles of a filler material.

According to a first aspect of the invention, the process includes spraying the particles of the filler material on at least two articles that each comprise at least one of the reinforcement fabrics to form particle-laden articles, stacking the particle-laden articles to form a stacked structure, and then curing a resin present within the stacked structure to form a laminate polymer composite material, which comprises the reinforcement fabric(s) and a polymer matrix formed by curing the resin.

According to a particular aspect of the invention, the articles can be dry fabrics that do not contain any resin or can be tackified with a limited amount of a tackifying resin, in which case the stacked structure is infiltrated with the resin for the polymer matrix prior to the curing step. Alternatively, the articles can be prepregs that further contain the resin, in which case the stacked structure does not require infiltration with the resin prior to the curing step.

According to other aspects of the invention, the above-described process can be employed in the fabrication of at least a portion of an aircraft engine nacelle, for example, the inlet lip of a fan nacelle. For such an application, the filler material is preferably, though not necessarily, a powder containing boron nitride, alumina, and/or aluminum nitride particles.

A technical effect of this invention is the ability to increase the filler loading of fabric-reinforced polymer composite materials, as compared to conventional resin infusion techniques. Higher filler loadings can be utilized to promote properties of the composite material, for example, thermal conductivity and/or mechanical properties. With respect to the latter, increased levels of a conductive filler in an inlet lip of a fan nacelle constructed of a fabric-reinforced polymer composite provides the capability of improving the efficiency with which the inlet lip can be heated to remove and prevent ice buildup.

Other aspects and advantages of this invention will be better appreciated from the following detailed description.

BRIEF DESCRIPTION OF THE DRAWINGS

FIGS. 3 and 4 schematically represent two methods by which filler particles can be incorporated into a fabric-reinforced composite material.

DETAILED DESCRIPTION OF THE INVENTION

Figure 1:
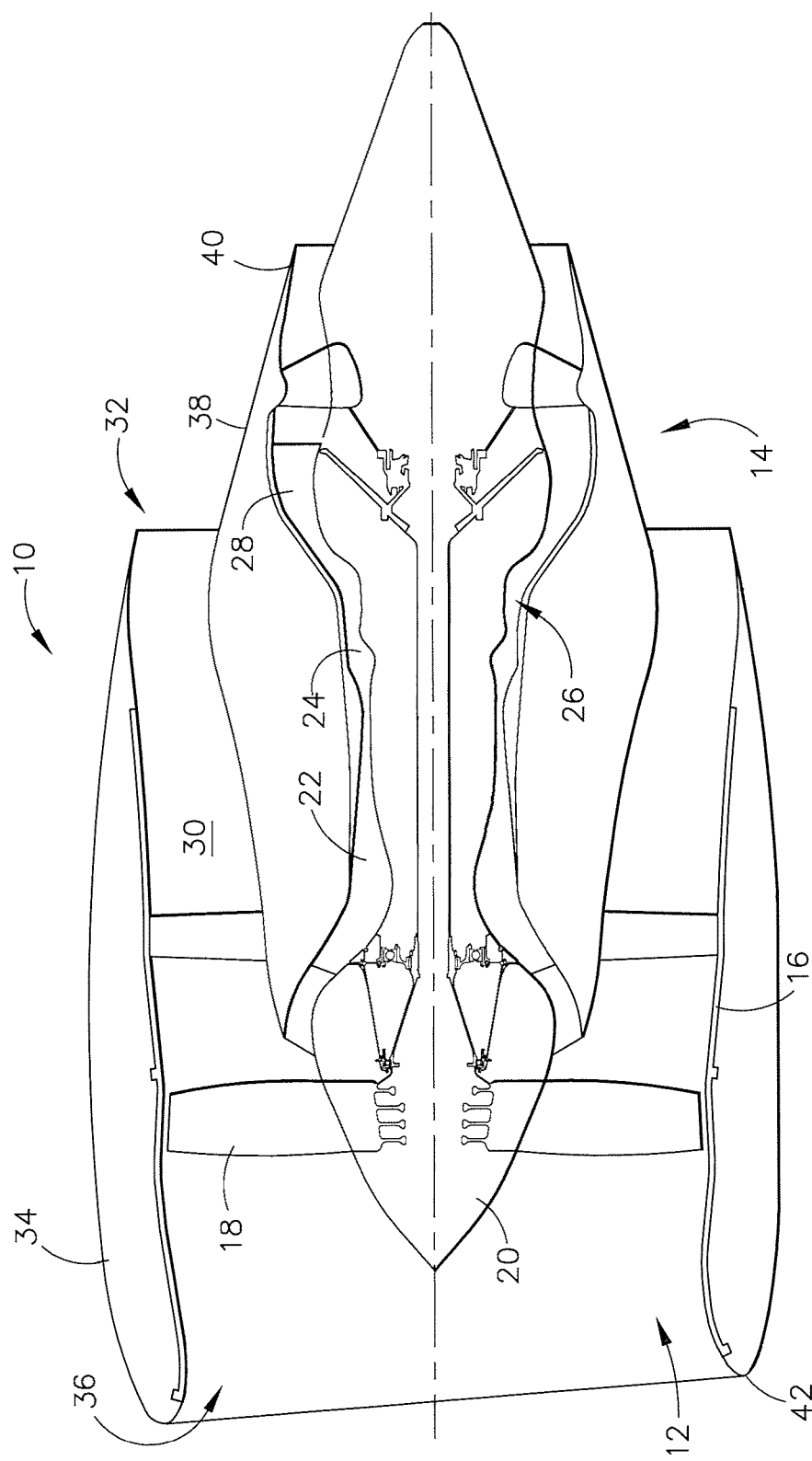
FIG. 1 schematically represents a cross-sectional view of a high-bypass turbofan engine.
Figure 2:
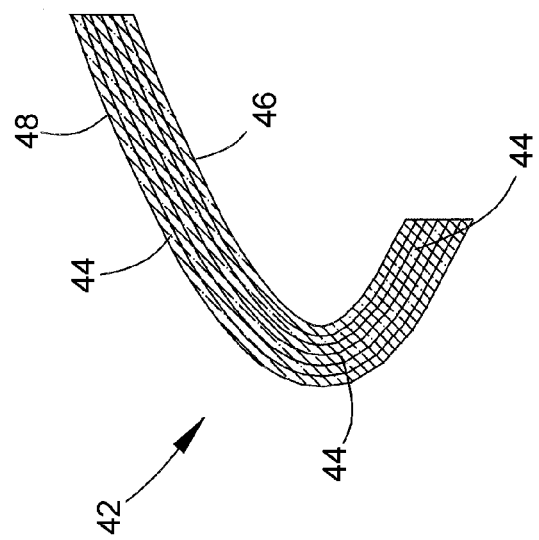
FIG. 2 is a detailed view showing a cross-section of the nacelle inlet lip of FIG. 1.

FIG. 2 represents an embodiment of an inlet lip 42 fabricated from a polymer composite material. As will be discussed below, one aspect of the invention is to maximize the thermal conductivity of the inlet lip 42 for the purpose of promoting the anti-icing and de-icing capability (hereinafter, simply referred to as anti-icing) of the lip 42. The invention is particularly well suited for use in a high-bypass turbofan engine, an example of which is the turbofan engine 10 represented in FIG. 1, though it should be understood that other applications are foreseeable. Finally, though the invention will be discussed in particular reference to the inlet lip 42, the benefits associated with the present invention can be applied to the entire nacelle 34, to other components of the turbofan engine 10, to other aircraft structures (for example, wing/tail regions), as well as a wide variety of applications outside the aerospace industry (for example, electrical enclosures), which may be fabricated from polymer composite materials that would benefit from having improved properties, such as thermal conductivity, electrical conductivity, interlaminar toughness, etc.

The inlet lip 42 (as well as the entire fan nacelle 34) can be formed of a variety of composite materials. In FIG. 2, the inlet lip 42 has a laminate construction, in which case the lip 42 is made up of individual polymer composite layers 44 that each contain a polymer matrix reinforced with a fabric or continuous fiber reinforcement material. The composite layers 44 are stacked, shaped and cured according to known practices to produce the laminate construction represented in FIG. 2.

The principal role of the matrix material in the polymer composite material is to contribute to the structural strength and other physical properties of the fiber reinforcement material as well as the composite structure as a whole. Preferred materials for the polymer matrix include advanced matrix materials that exhibit temperature and impact resistance suitable for withstanding FOD and other types of damage to which the inlet lip 42 is likely to be subjected to during operation of the engine 10. The matrix material should also be capable of curing at temperatures and under conditions that will not thermally degrade or otherwise be adverse to the fiber reinforcement material. On this basis, particularly suitable resin systems are believed to be thermoset and thermoplastic materials, such as poly(aryl)etheretherketone (PEEK), poly (aryl)etherketoneketone (PEKK), polyphenylene sulfide (PPS), and epoxies, though the use of other matrix materials is foreseeable.

The fiber reinforcement component of the composite layers 44 may be produced with fiber materials to have a desired fiber architecture. For example, fabrics formed of carbon (graphite) fibers are believed to be a particularly suitable reinforcement material, though it is foreseeable that other fiber materials could be used in addition to or in place of carbon fibers. The fiber architecture can be produced using known fabric weaving, stitching, non-crimp and braiding techniques, including three-dimensional braiding or weaving techniques that are capable of promoting through-plane heat transfer through the thickness of the inlet lip 42 (or any other laminate polymer composite structure formed with the composite layers 44).

It should be understood that the embodiment of FIG. 2 is not limited to the particular number and arrangement of composite layers 44 shown in FIG. 2. In addition, it is also foreseeable that a core material (not shown), such as a lightweight foam or honeycomb polymeric material, could be incorporated into the laminate polymer composite structure, as is common for aircraft engine nacelle components such as engine inlets, thrust reversers, core cowls, and transcowls, as well as other aerostructures including acoustic panels. In view of the materials noted above, the inlet lip 42 (as well as other components that can be formed by a laminate polymer composite structure of the type represented in FIG. 2) can be considerably lighter than inlet lips formed of aluminum or other metal alloys conventionally used in the prior art. The thickness of the inlet lip 42 should be sufficient to provide structural integrity without unnecessarily contributing weight. Though a wide range of thicknesses is possible, a suitable range is believed to be about 1.5 to about 2.5 millimeters. For other components that can be fabricated to have a laminate polymer composite construction similar to that represented in FIG. 2, greater and lesser thicknesses are foreseeable and also within the scope of the invention.

As noted above, a particular aspect of the invention is to promote the thermal conductivity of the laminate polymer composite structure represented in FIG. 2, for example, to promote the anti-icing capability of an inlet lip 42 formed by the composite structure. As previously discussed, the inlet lip 42 and more specifically its outer surface 48 is subject to icing conditions while the engine 10 is on the ground and under flight conditions. To provide an anti-icing capability, various methods and systems can be employed to heat the outer surface 48 of the inlet lip 42, for example, by directing engine-supplied hot bleed air at the inner surface 46 of the inlet lip 42 or by utilizing an electrical anti-icing system that includes heater strips to locally heat portions of the lip 42 most susceptible to icing.

According to a preferred aspect of the invention, heat transfer from the inner surface 46 of the inlet lip 42 to its outer surface 48 is promoted by the incorporation of a conductive filler material powder into the laminate polymer composite material from which at least the lip 42 of the fan nacelle 34 is constructed. Suitable filler materials include, but are not limited to, inorganic materials such as boron nitride, alumina and aluminum nitride, though the incorporation of organic materials is also within the scope of the invention. The choice and amount of filler material will be based in part on the desired properties of the composite layers 44 and inlet lip 42 (or other laminate produced from the layers 44). Boron nitride is a particularly suitable filler material to promote the through-thickness thermal conductivity of the inlet lip 42, and also has the beneficial effect of enhancing the compression modulus and interlaminar toughness of the inlet lip 42. The filler material is preferably incorporated into each composite layer 44 in an amount of at least 3 volume percent, for example, about 10 to about 20 volume percent, resulting in an equivalent filler content in the final laminate polymer composite material produced with the composite layers 44.

FIGS. 3 and 4 represent two techniques by which particles of a powder filler material 52 (for example, conductive filler materials such as boron nitride, alumina and/or aluminum nitride) can be incorporated into one or more of the individual composite layers 44 of the laminate polymer composite structure of FIG. 2 and, therefore, an inlet lip 42 (or other component) formed by the laminate polymer composite structure. Both techniques involve spraying a dry powder of the filler material 52 to incorporate the filler material 52 into the reinforcement material of the composite layers 44, for example, the aforementioned fabrics formed of carbon (graphite) fibers. The techniques differ primarily as a result of the technique of FIG. 3 incorporating the filler material 52 into dry (resin-free) and/or tackified fabrics 54 and then infusing a resin system (for example, one of the aforementioned resin systems) into the resulting powder-laden dry or tackified fabrics 56, whereas FIG. 4 incorporates the filler material 52 into one or more fabrics that have already been impregnated with a resin system (for example, one of the aforementioned resin systems) to yield a prepreg 74. In each case, the techniques of FIGS. 3 and 4 are intended to achieve higher filler material concentrations within the composite layers 44 than would be possible if attempting to infuse dry fabrics with a resin system laden with a powder filler material, which is the traditional technique for incorporating powders into composite materials.

Referring to FIG. 3, a conventional spray gun 50 of a type adapted to spray dry powders is used to spray the dry powder filler material 52 into a fabric 54, which will be referred to herein as a "dry" fabric 54 in that it preferably does not contain the resin that will form the polymer matrix of the composite layers 44. However, the term "dry fabric" is used herein to also allow the fabric 54 to optionally contain a limited amount of a resin capable of tackifying the fabric 54 to promote adhesion of the particles of the filler material 52 to the fabric 54. The tackifier resin is preferably not present in such amounts that would completely fill the spaces between adjacent fibers of the fabric 54. While the dry spraying technique of FIG. 3 is believed to be preferred for incorporating particles of the powder filler material 52 into the dry fabric 54, other techniques are foreseeable, for example, by coating the fabric 54 with a dry powder using a fluidized bed.

The fabric 54 is represented in FIG. 3 as being electrically biased so that a static charge is present to promote adhesion of the particles of filler material 52 to the fabric 54. Suitable particle sizes for the filler material 52 are generally micron-size or less, for example, a particle size of about 1 to about 150 micrometers, and more preferably a particle size of about 10 to about 60 micrometers. Notably, it is unnecessary for the filler material 52 to contain nano-sized particles. The spray conditions are preferably such that the filler material 52 penetrates the through-thickness of the fabric 54. With this method, particles of the filler material 52 can be incorporated into the fabric 54 in amounts of 3 volume percent or more, for example, about 10 to about 20 volume percent.

Following incorporation of the filler material 52 into a sufficient number of dry fabrics 54 to form the inlet lip 42, the resulting dry powder-laden fabrics 56 are stacked to form a dry stacked structure 58, which then undergoes infiltration with the desired resin system to produce the inlet lip 42 and its composite layers 44. Because the filler material 52 is already incorporated into the dry stacked structure 58, the resin system used to infiltrate the structure 58 can be completely free of any powder filler material, which if present would undesirably increase the viscosity of the resin system and inhibit infiltration of the stacked structure 58 by the resin system. Suitable infiltration techniques include, but are not limited to, resin transfer molding (RTM) and particularly vacuum-assisted resin transfer molding (VaRTM), which are well known for producing resin-impregnated laminate composite structures. For illustrative purposes, FIG. 3 represents the dry stacked structure 58 of the powder-laden fabrics 56 undergoing a VaRTM process, by which a resin system 60 is infused into the stacked structure 58, which is placed between a caul 62 and bag 64. A vacuum created between the caul 62 and bag 64 promotes the infiltration of the individual fabrics 56 of the stacked structure 58 with the resin system 60, after which the resin-infused stacked structure 58 can be consolidated and cured to yield a laminated stack of composite layers 44. Further details of such are process are well within the expertise of those skilled in the art, and therefore do not need to be discussed in any detail here. The resulting laminate polymer composite material produced with the composite layers 44 preferably contains at least 3 volume percent of the filler material 52, more preferably about 10 to about 20 volume percent of the filler material.

As noted above, the incorporation technique of FIG. 4 involves incorporating the filler material 52 into a prepreg 74, which is formed of at least one fabric (for example, the fabric 54 of FIG. 3) that has already been at least partially impregnated with a resin system (for example, one of the aforementioned resin systems). The filler material 52 is represented as being sprayed onto a single surface of the prepreg 74, though the filler material 52 could be deposited on both surfaces of the prepreg 74. As with the dry fabric 54 of FIG. 3, the prepreg 74 of FIG. 4 is represented as being electrically biased so that a static charge is present to promote adhesion of the particles of filler material 52 to the prepreg 74. Because the prepreg 74 is impregnated with resin, which likely completely fills spaces between adjacent fibers of the one or more fabrics contained by the prepreg 74, particles of the filler material 52 are not likely to penetrate the through-thickness of the prepreg 74, but instead tend to deposit on the surface and near-surface regions of the prepreg 74. The particles may be deposited to form a substantially uniform continuous layer on the surface of the prepreg 74, likely to thicknesses of more than one particle. Suitable particle sizes for the filler material 52 can be the same as described above for the embodiment of FIG. 3, and particles of the filler material 52 can be incorporated into the prepreg 74 in the same volumetric amounts as described above for the fabric 54 of FIG. 3.

Following incorporation of the filler material 52 into the prepreg 74, the resulting powder-laden prepreg 76 is preferably sprayed with a resin 80 to wet the particles of the filler material 52, promote their adhesion to the prepreg 74, and generally tackify the powder-laden prepreg 76. The resin 80 may be the same resin system that had been used to infiltrate the fabric(s) to form the original prepreg 74. The resin 80 is represented as being sprayed onto a single surface of the powder-laden prepreg 76, though both surfaces of the prepreg 76 could be coated with the resin 80. A sufficient amount of the resin 80 is preferably applied so that all particles of the filler material 52 are covered by a film of the resin 80.

A sufficient number of the powder-laden prepreg 76 are produced in the manner described above to form the inlet lip 42. The resulting resin-coated powder-laden prepregs 76 are then stacked to form a stacked structure 78, which then undergoes consolidation and curing to yield a laminated stack of composite layers 44. Because the resin is already incorporated into the stacked structure 78, additional resin is not necessary to infiltrate the structure 78 prior to curing. For illustrative purposes, FIG. 4 represents the stacked structure 78 of powder-laden prepregs 76 as undergoing an autoclave process, in which the stacked structure 78 is placed between a caul 82 and bag 84 and then subjected to pressure and heat. Further details of such are process are well within the expertise of those skilled in the art, and therefore do not need to be discussed in any detail here.

In investigations leading to the present invention, polymer composites containing a polymer matrix reinforced with carbon fabrics were produced to further contain a filler material of either alumina or boron nitride powder. Baseline composites were produced by incorporating the filler material into a resin system and then infiltrating dry carbon fabrics with the powder-containing resin system in accordance with prior art practices. Other composites were produced by directly incorporating the filler material into dry carbon fabrics and then infiltrating the powder-laden fabrics with a powder-free resin system in accordance with FIG. 3. Through-thickness thermal conductivities of up to about 2.58 W/mK and filler material contents of up to about 20.6 volume percent were achieved with the process of FIG. 3, as compared to thermal conductivities of about 0.8 W/mK and filler material contents of up to about 4 volume percent achieved with the prior art process. While the focus of the investigation was to increase through-thickness thermal conductivities, other possible benefits include improved mechanical properties, such as interlaminar toughness, compression modulus, etc.

While the invention has been described in terms of specific embodiments, other forms could be adopted by one skilled in the art. For example, the physical configuration of the nacelle 34 and its inlet lip 42 could differ from what are shown in the Figures, and laminate polymer composite structures that can be produced by this invention can be used in a wide variety of applications other than nacelle structures, as well as applications outside the aerospace industry. Therefore, the scope of the invention is to be limited only by the following claims.

The invention claimed is:

1. A process for fabricating a laminate polymer composite material that comprises a polymer matrix containing multiple reinforcement fabrics and particles of a filler material, the polymer matrix being formed by curing a resin, the process comprising:

providing at least two articles that each comprise at least one of the reinforcement fabrics, wherein the articles do not contain the resin, the reinforcement fabrics thereof are dry, and spaces are present between adjacent fibers of the reinforcement fabrics;

applying means to each of the articles for promoting adhesion of the particles of the filler material to the articles;

spraying the particles of the filler material on each of the articles so that each of the articles individually forms a particle-laden article in which the particles of the filler material are adhered thereto by the adhering means applied thereto, wherein the particle-laden articles do not contain the resin, the reinforcement fabrics thereof are dry, and the spraying step causes the particles of the filler material to penetrate the reinforcement fabrics and be adhered to the reinforcement fabrics by the adhesion-promoting means applied thereto;

stacking the particle-laden articles to form a stacked structure, wherein the stacked structure does not contain the resin and the reinforcement fabrics thereof are dry;

infusing the resin into the stacked structure; and curing the resin present within the stacked structure to form the laminate polymer composite material comprising the reinforcement fabric and the polymer matrix formed by curing the resin.

2. The process according to claim 1, wherein the adhesion-promoting means comprises a tackifier resin that is present on the reinforcement fabrics to promote adhesion of the particles of the filler material to the reinforcement fabrics without completely filling spaces within the reinforcement fabrics.

3. The process according to claim 1, wherein the laminate polymer composite material contains in excess of 10 volume percent of the filler material.

4. The process according to claim 1, wherein the reinforcement fabrics comprise carbon fabrics.

5. The process according to claim 1, wherein the filler material is at least one material chosen from the group consisting of boron nitride, alumina, and aluminum nitride.

6. The process according to claim 1, wherein the resin is chosen from the group consisting of poly(aryl)etheretherketone, poly(aryl)etherketoneketone, polyphenylene sulfide, and epoxy resin systems.

7. The process according to claim 1, wherein the laminate polymer composite material is at least a portion of an aircraft engine nacelle.

8. The process according to claim 7, further comprising installing the aircraft engine nacelle on an aircraft engine so as to surround a fan of the aircraft engine.

9. The process according to claim 7, wherein the portion comprises an inlet lip of the aircraft engine nacelle.

10. A process for fabricating a laminate polymer composite material that comprises a polymer matrix containing multiple reinforcement fabrics and particles of a filler material, the polymer matrix being formed by curing a resin, the process comprising:

providing at least two reinforcement fabrics that do not contain any of the resin and spaces are present between adjacent fibers of the reinforcement fabrics;

applying an electrical bias to each of the reinforcement fabrics;

spraying the particles of the filler material on each of the reinforcement fabrics so that each of the reinforcement fabrics individually forms a dry particle-laden fabric in which the particles of the filler material are adhered to the reinforcement fabrics by the electrical bias applied thereto;

stacking the dry particle-laden fabrics to form a dry stacked structure;

infusing a resin into the dry stacked structure; and curing the resin within the stacked structure to form the laminate polymer composite material comprising the reinforcement fabrics and the polymer matrix formed by curing the resin.

11. The process according to claim 1, wherein the adhesion-promoting means comprises an electrical bias applied to the articles to promote adhesion of the particles of the filler material to the reinforcement fabrics.

12. The process according to claim 10, further comprising applying a tackifier resin to the reinforcement fabrics to promote adhesion of the particles of the filler material to the reinforcement fabrics without completely filling spaces within the reinforcement fabrics.

* * * * *